United States Patent [19]
Morgan

[11] Patent Number: 6,002,452
[45] Date of Patent: Dec. 14, 1999

[54] SEQUENTIAL COLOR DISPLAY SYSTEM WITH SPOKE SYNCHRONOUS FRAME RATE CONVERSION

[75] Inventor: Dan Morgan, Denton, Tex.

[73] Assignee: Texas Instruments Incorporated, Dallas, Tex.

[21] Appl. No.: 08/659,485

[22] Filed: Jun. 6, 1996

[51] Int. Cl.$^6$ .............................. H04N 9/12; H04N 9/30

[52] U.S. Cl. ...................... 348/742; 348/743; 348/771; 348/268; 348/70; 348/739

[58] Field of Search .................................. 348/743, 742, 348/771, 739, 268, 269, 270, 271, 68, 69, 70; H04N 9/12, 9/30, 9/31

[56] References Cited

U.S. PATENT DOCUMENTS

| | | | |
|---|---|---|---|
| 5,046,162 | 9/1991 | Ishikawa et al. | 358/42 |
| 5,061,049 | 10/1991 | Hornbeck | 359/224 |
| 5,079,544 | 1/1992 | Demond et al. | 340/701 |
| 5,101,236 | 3/1992 | Nelson et al. | 355/229 |
| 5,105,369 | 4/1992 | Nelson | 364/525 |
| 5,278,652 | 1/1994 | Urbanus et al. | 358/160 |
| 5,428,408 | 6/1995 | Stanton | 348/742 |
| 5,448,314 | 9/1995 | Heimbuch et al. | 348/743 |
| 5,452,024 | 9/1995 | Sampsell | 348/755 |
| 5,467,146 | 11/1995 | Huang et al. | 348/743 |
| 5,523,803 | 6/1996 | Urbanus et al. | 348/771 |
| 5,528,317 | 6/1996 | Gove et al. | 348/743 |
| 5,625,424 | 4/1997 | Conner et al. | 348/743 |
| 5,657,099 | 8/1997 | Doherty et al. | 348/743 |
| 5,668,572 | 9/1997 | Meyer et al. | 348/743 |
| 5,680,180 | 10/1997 | Huang | 348/743 |
| 5,691,780 | 11/1997 | Marshall et al. | 348/743 |
| 5,706,061 | 1/1998 | Marshall et al. | 348/743 |
| 5,774,196 | 6/1998 | Marshall | 348/743 |
| 5,777,589 | 7/1998 | Gale et al. | 348/771 |
| 5,777,694 | 7/1998 | Poradish | 348/743 |

FOREIGN PATENT DOCUMENTS

| | | |
|---|---|---|
| 0 635 986 A1 | 2/1990 | European Pat. Off. . |
| 0 663 770 A1 | 10/1994 | European Pat. Off. . |
| 0 662 773 A1 | 5/1995 | European Pat. Off. . |
| 2 132 387 | 7/1984 | United Kingdom . |

OTHER PUBLICATIONS

08/414,707—TI–19200 –Spatial Light Imaging System with Synchronized and Modulated Light Source.
08/371,348—TI–18893 –DMD Modulated Continuous Wave Light Source for Xerographic Printer.
08/373,692—TI–18371—Monolithic Programmable Format Pixel Array.
Patent Abstracts of Japan, "Photoconductive Film Lamination System Liquid Crystal Projector" Moriyama Yoshiaki, Apr. 11, 1994, JP6308527.
"Morris on a Chip" IEEE Spectrum, vol. 30, No. 11, Nov. 1, 1993. pp. 27–31.

*Primary Examiner*—John K. Peng
*Assistant Examiner*—Jean W. Desir
*Attorney, Agent, or Firm*—Charles A. Brill; Frederick J. Telecky, Jr.; Richard L. Donaldson

[57] ABSTRACT

A sequential color display system (10) suited to receive data (20) at different rates without discarding or filtering video data. The mismatch of bandwidths between the input source video data and the output sequential color display is accommodated by retaining a modified synchronous operation. A color wheel (50) having a plurality of segments is utilized whereby the input frame rate in reference to the color wheel rate is always a ratio of integers. Using a digital micromirror device (44) spatial light modulator, no mixing of frame-to-frame bit planes is required during a colored segment. In the preferred embodiment, the ratio of integers is 7-to-6 for a 50 hertz input, such as a PAL system, or a 5-to-6 ratio for a 72 hertz input. The color wheel is maintained at about a 60 hertz rate.

14 Claims, 4 Drawing Sheets

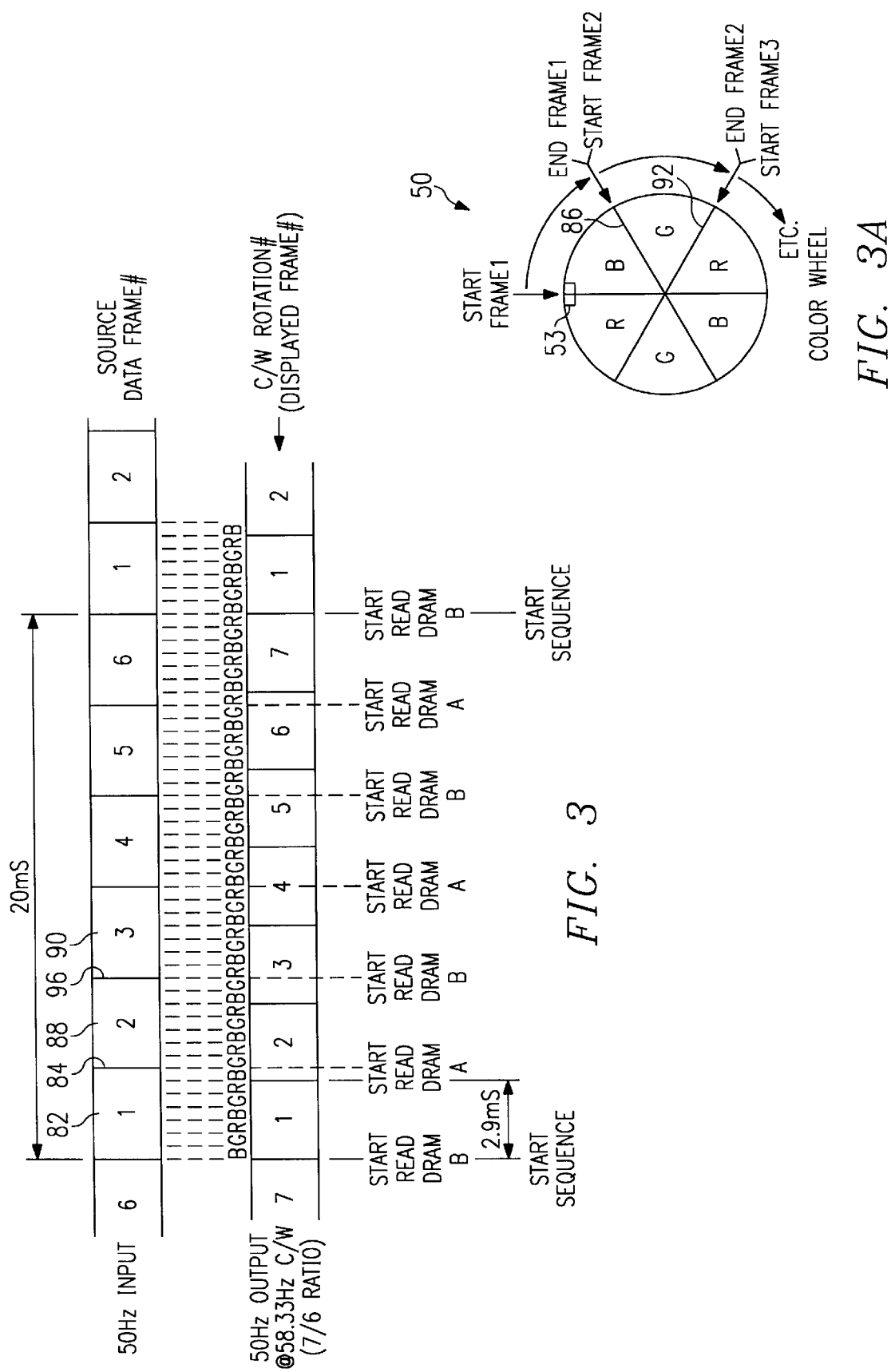

SEQUENTIAL COLOR DISPLAY SYSTEM WITH SPOKE SYNCHRONOUS FRAME RATE CONVERSION

CROSS REFERENCE TO RELATED APPLICATIONS

Cross reference is made to the following co-pending patent applications, each being assigned to the same assignee as the present invention and the teachings included herein by reference:

| SERIAL NUMBER | TITLE | FILING DATE |
| --- | --- | --- |
| 08/414,707 | Spatial Light Imaging System with Synchronized and Modulated Light Source | 03/13/95 |
| 08/179,028 | Method and Apparatus for Sequential Color Imaging | 01/07/94 |
| 08/146,385 | DMD Display System | 11/01/93 |
| 08/221,739 | Illumination Control Unit for Display System with Spatial Light Modulator | 03/31/94 |
| 08/371,348 | DMD Illuminator Switch | 01/11/95 |
| 08/373,692 | Monolithic Programmable Digital Micro-Mirror Device | 01/17/95 |

FIELD OF THE INVENTION

This invention relates generally to imaging systems such as those including a spatial light modulator, and more particularly to a method and apparatus for performing sequential color imaging from input data having a varying data frame rate.

BACKGROUND OF THE INVENTION

Spatial Light Modulators (SLMs) are widely used in the industry for video monitors, graphic displays, projectors, and hard copy printers. SLMs are devices that modulate incident light in a spatial pattern corresponding to an electrical or optical input. The incident light may be modulated in its phase, intensity, polarization, or direction. This light image is directed and focused to a screen in the case of a projector, video monitor or display, or is ultimately focused on a light sensitive material, such as a photoreceptor drum, in the case of a xerographic printer.

The light modulation may be achieved by a variety of materials exhibiting various electro-optic or magneto-optic effects, and by materials that modulate light by surface deformation. Other spatial light modulators may include tiny micro-mechanical devices comprising an array of positionable picture elements (pixels). The light image can be colored if it is to be displayed on a screen of a projector, monitor, or a television and the like. This coloring is typically done in one of two ways, either using non-sequential color systems, or using sequential color systems. A non-sequential color system simultaneously generates multiple colors of light, such as red, green and blue light. An example of a non-sequential color system is discussed in commonly assigned U.S. Pat. No. 5,452,024, issued Sep. 19, 1995, entitled "DMD Display System", the teachings included herein by reference. In sequential color systems, color images are generated by sequentially projecting colored light, i.e. red, green and blue light, in a single image frame, which typically lasts 1/60 of a second for a 60 Hertz system. Sequential color systems typically utilize a color wheel that is partitioned into a plurality of colored segments, such as a red, green, and blue segment, or multiples/combinations thereof. An example of a sequential color system is disclosed in commonly assigned U.S. Pat. No. 5,448,314, issued Sep. 5, 1995, entitled "Method and Apparatus for Sequential color Imaging", the teachings included herein by reference.

A recent innovation of Texas Instruments Inc. of Dallas, Tex. is an imaging system using an SLM having an array of individual micro-mechanical elements, known as a digital micromirror device (DMD), also referred to as a deformable mirror device. The DMD is a spatial light modulator suitable for use in displays, projectors and hard copy printers. The DMD is a monolithic single-chip integrated circuit, comprised of a high density array of 16 micron square deflectable micromirrors on 17 micron centers. These mirrors are fabricated over address circuitry including an array of SRAM cells and address electrodes. Each mirror forms one pixel of the DMD array and is bi-stable, that is to say, stable in one of two positions. A source of light directed upon the mirror array will be reflected in one of two directions by each mirror. In one stable "on" mirror position, incident light to that mirror will be reflected to a projector lens and focused on a display screen or a photosensitive element of a printer, and forms an image of the mirror/pixel. In the other "off" mirror position, light directed on the mirror will be deflected to a light absorber. Each mirror of the array is individually controlled to either direct incident light into the projector lens, or to the light absorber. In the case of a display, a projector lens and a light prism ultimately focus and magnify the modulated light image from the pixel mirrors onto a display screen and produce a viewable image. If each pixel mirror of the DMD array is in the "on" position, the displayed image will be an array of bright pixels.

For a more detailed discussion of the DMD device, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System exposure Module Alignment Method and Apparatus of Manufacture", each patent being assigned to the same assignee of the present invention and the teachings of each are incorporated herein by reference. Gray scale of the pixels forming the image can be achieved by pulse width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

In non-sequential color systems, three (3) DMD arrays can be used to modulate colored light, one each for red, green, and blue light, as disclosed in the commonly assigned U.S. Pat. No. 5,452,024, issued Sep. 19, 1995, titled "DMD Display System", the teachings of which are included herein by reference. In contrast, a sequential color system requires only one such DMD device, with the red, green, and blue light being sequentially modulated and reflected by the single DMD array to a screen. The need for three such arrays in the non-sequential color system triples the requirement for the DMD arrays, and attendant hardware over the sequential color system, but offers increased display brightness. Thus, there is a trade off between the complexity, cost and performance of a non-sequential color system when viewed against a sequential color system.

In the case of a sequential color system, a single light source is typically used, such as disclosed in U.S. Pat. No. 5,101,236 to Nelson, et al, entitled "Light Energy Control System and Method of Operation", assigned to the same assignee as the present invention and the teachings of which are included herein by reference. These lamps may typically be comprised of a xenon or metal halide arc lamp, or lasers. This arc lamp may be powered by an AC or DC power source.

In conventional display systems, the video frame rate or refresh rate of the display is typically 60 hertz (Hz), or 60 frames a second. However, the incoming (source) data frame rate may vary from 60 frames a second. For instance, while a typical NTSC signal provides video frame data at 60 hertz, the video source frame rate for a PAL system is 50 hertz. Video or computer graphics data, meanwhile, is received at many other frame rates other than 60 hertz, typically being 72 hertz.

Typically, when the input frame rate deviates from 60 hertz in a 60 hertz sequential color display system, data must be discarded or filtered (e.g. averaged) before video is displayed due to the mismatch of bandwidths between the input source video and the output color sequential display rate. Rather than display video at 72 hertz for a 72 hertz input, the incoming data is discarded or filtered to maintain a 60 hertz video display frame rate. Discarding data will generate motion artifacts. Filtering data adds components and system cost. If incoming video data is received at a slow rate, operating in synchronism at a slower display rate, like 50 hertz, would generate a noticeable flicker in the display to the observer provided the screen is bright enough. Therefore, the data is averaged to maintain a 60 hertz display rate. Thus, retaining synchronous operation may not be sufficient for high quality video.

Additional problems arise in a DMD display system since data is displayed in a bit-plane format. One solution to the input/output frame rate mismatch, when doing color sequential displaying of data, is to asynchronously read the data from frame buffers. However, since the data displayed during any color segment may be from two different frames, a mixing of bit-plane information from these two frames occurs. This mixing of bit-plane can result in significant degradation of signal-to-noise ratio especially near MSB transition codes when using pulse width modulation techniques to determine the "on" time of the mirrors during one video frame. To see this, referring to FIG. 1, consider a DMD with 8-bits of color code, without bit-splitting, where the MSB is displayed during the entire first half of each color segment. If a pixel code 80 hex (midscale) from the source has a slight amount of noise, then 7 Fhex may be displayed during the first half of a color segment and 80 hex during the second half if two different frames are displayed during this color segment. A code of 00 hex would be displayed resulting in a half-scale error on the display as shown in FIG. 1. This is an extreme example, but even with bit-splitting during the color segments, the noise generation is significant when using an asynchronous frame buffer approach for frame rate conversion.

It is desirable to maintain the output color sequencing display frame rate of 60 hertz, even when the input source video frame rate is not at 60 hertz, without discarding, filtering or averaging video data. In addition, for DMD applications, it is desirable to eliminate the signal-to-noise degradation due to frame-to-frame bit-plane mixing during color segments without resorting to forcing the color sequencing rate to match the source video frame rate.

SUMMARY OF THE INVENTION

The present invention achieves technical advantages as a display system by using a color wheel having a plurality of colored segments, whereby the source frame transition time always occurs at a colored segment transition, but could also occur at the middle of a colored segment. In other words, the color wheel rate and the source video frame rate is always a ratio of integers. In this way, over time, the source frame transition time rotates around the colored segments facilitating no discarding of data, no filtering for processing, and no mixing of frame-to-frame bit-planes for DMD displays. The ratios are maintained accurate enough so that the color sequence rate can be maintained at about 60 hertz while the source video rate is different than 60 hertz. For instance, if the input source video rate is 50 hertz, which is typical of a PAL format signal, the color wheel is rotated at about 58.33 hertz, which is an integer ratio of -7-to-6 (color wheel rotation rate to incoming data rate, 58.3333/50=7/6). If the incoming source video rate is 72 hertz, which is typical of video or computer graphics data, the color wheel is rotated at 60 hertz. This corresponds to a ratio of integers being 7-to-6. In this way, the source frame transition time of incoming data always occurs at a colored segment transition or at the middle of a colored segment of the color wheel. Preferably, the color wheel has six segments, comprising of two red, two green, and two blue segments, preferably which alternate around the wheel, however, at least two segments of like color could be adjacent one another.

According to the preferred embodiment of the present invention, the display system comprises a spatial light modulator, a light source providing light, and a color wheel rotating at a wheel rate and coloring the light, this colored light illuminating the spatial light modulator. A logic circuit has an input receiving frames of data at a frame rate and communicating this data to the spatial light modulator. A control circuit detects the frame rate, and adjusts the color wheel rate to maintain a ratio of integers with reference to the frame rate. The color wheel has multiple colored segments, where each segment is illuminated equally in time by the light source for each of the frames of data, except for one or more segments, when the frame rate is lower or greater than the wheel rate. However, the transition time between the incoming frames of data to be displayed always occurs at the transition between a pair of the colored segments being illuminated by the light source, or in the middle of a colored segment to avoid generating artifacts.

Preferably, the color wheel has a plurality of pairs of colored segments, wherein each segment, except at least one, is illuminated for each frame of incoming data when the incoming frame rate is lower than the predetermined wheel rate. When the incoming frame rate is higher than the predetermined wheel rate, at least one segment is illuminated one more time than the other colored segments while displaying one frame of incoming data. In other words, for a color wheel having N colored segments, N−1 segments, N−2 segments etc. are illuminated each data frame when the incoming frame rate is lower than the predetermined wheel rate, but where N+1 segments, N+2 segments etc. are illuminated each data frame when the incoming frame rate is higher than the predetermined wheel rate. In the preferred embodiment, the ratio of incoming frame rate to the wheel rate is 7-to-6 when the incoming frame rate is lower than the wheel rate. However, the ratio of the incoming frame rate to the wheel rate is 5-to-6 when the incoming frame rate is higher than the wheel rate. If the incoming frame rate is the predetermined wheel rate; i.e. 60 hertz, the ratio is 1-to-1 and the rates match.

The control circuit provides a wheel motor sync output at a rate being a function of a vertical sync rate of the frames of incoming data. The sync output rate is unequal to the vertical sync rate when the vertical sync rate deviates from a predetermined rate, whereby the wheel rate is a function of the sync output. However, the sync output rate is identical to the vertical sync rate when incoming frame rate is identical to the predetermined rate.

The method of operating the sequential display system comprises utilizing a color wheel having a plurality of colored segments to color source light illuminating a spatial light modulator, the color wheel rotating at a wheel rate. The colored light is modulated with the spatial light modulator according to the frames of data received at a frame rate. The wheel rate is controlled to be a ratio of integers with respect to the frame rate, wherein the ratio of integers is other than 1-to-1 except when the incoming frame rate is identical to a predetermined desired wheel rate. Preferably, a color wheel is implemented having at least six colored segments of at least three different colors. The transition time between the frames of source data always occurs when a transition between the wheel colored segments is proximate the source light, or when the middle of a colored segment is proximate the source.

By insuring the color wheel rate in reference to the incoming data frame rate is a ratio of integers, the incoming frames of data can be displayed whereby the transition time between the frames of data occurs at the interface of the wheel colored segments. Alternatively, this transition time can take place at the middle of a colored segment. The interface between the wheel colored segments is commonly known as a spoke. The present invention is a spoke-synchronous frame rate display system that maintains a spoke being in synchronism with the incoming data frame rate. When the incoming frame rate and the wheel rate are not matched, the transition point for incoming frames of data sequentially occurs at a different colored segment boundary. For a six color segment, having six spokes, each spoke is synchronized to sequentially match with the transition point for input frames of data every six rotations.

BRIEF DESCRIPTION OF THE DRAWINGS

FIG. 3 is an illustrations of the spoke-synchronous frame rate conversion when the incoming frame rate, i.e. 50 hertz, is less than the color wheel rate, whereby the color wheel rate is maintained to be a ratio of integers with respect to the input frame rate, i.e., a 7-to-6 ratio.

DESCRIPTION OF THE PREFERRED EMBODIMENT

Figure 1:
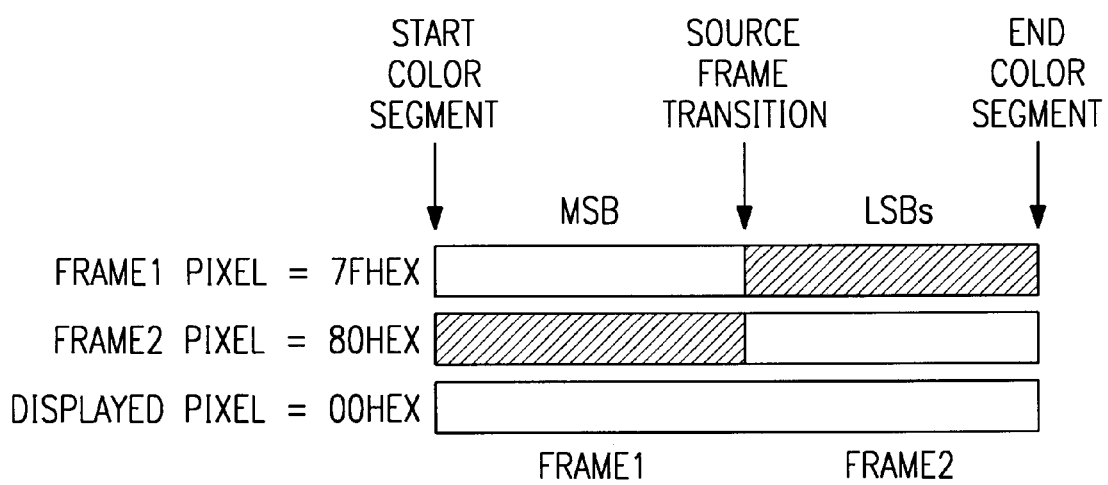
FIG. 1 is an illustration of bit-plane information mixing when asynchronously reading data from frame buffers.
Figure 2:
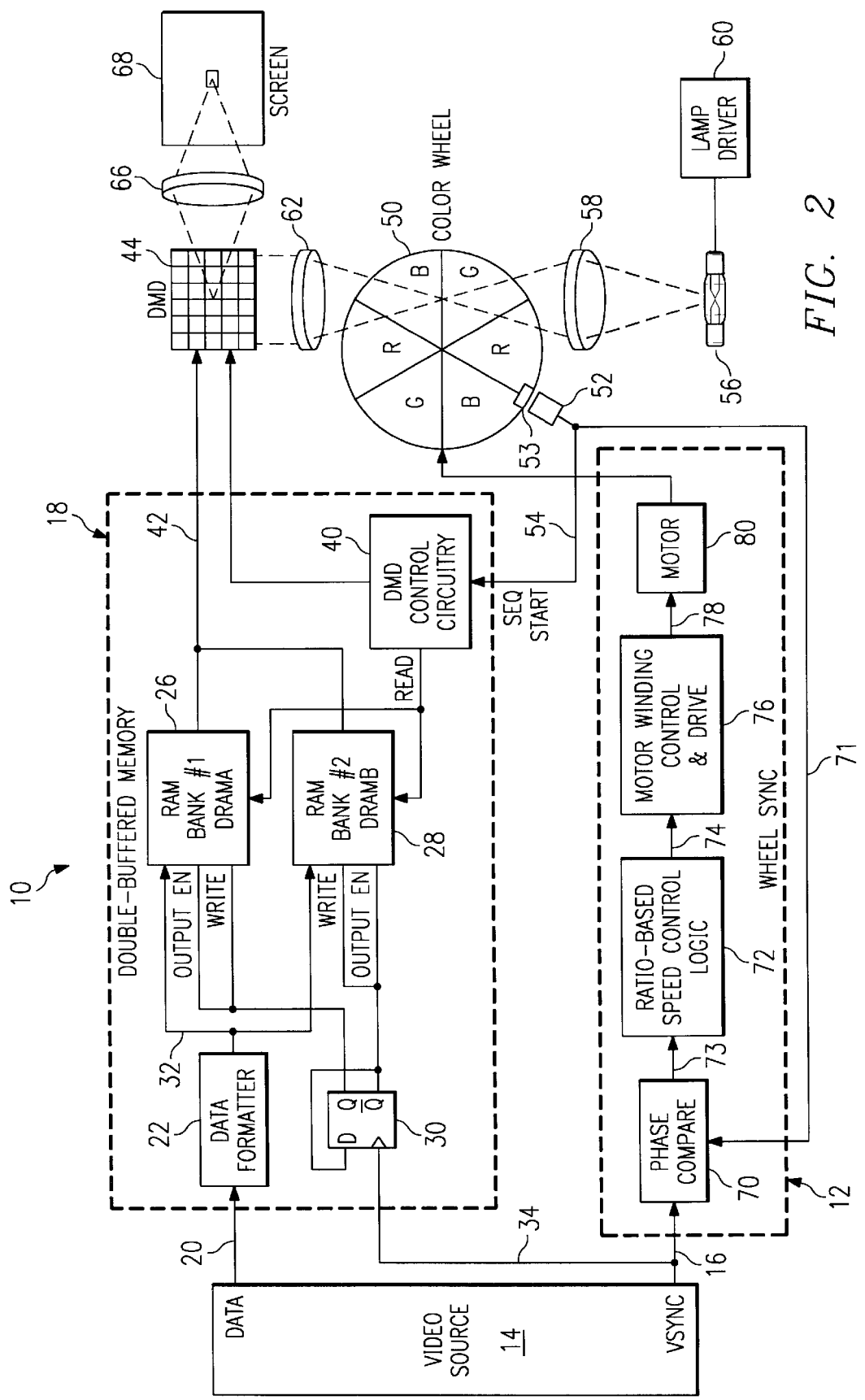
FIG. 2 is a block diagram of a spoke-synchronous colored sequential system according to the preferred embodiment of the present invention, whereby the incoming data frame rate as compared to the color wheel rate is always a ratio of integers.

Referring now to FIG. 2, there is generally shown at 10 a sequential color imaging display system according to the preferred embodiment of the present invention. System 10 is seen to include a control circuit generally shown at 12 being responsive to the vertical sync VSYNC signal of a video source 14 provided on line 16, and a logic circuit generally shown at 18 being connected to and responsive to frames of incoming video data provided by source 14 on line 20.

Incoming frames of video data provided by source 14 on line 20 are formatted by a data formatter 22. If this data is not already in the digital domain, it is first converted by an analog-to-digital circuit, not shown, and then formatted. For ease of illustration of the present invention, the incoming video data provided on line 20 is to be understood as already being in the digital domain. Data formatter 22 formats this stream of digital data, and alternately writes frames of this data into a pair of RAM memory banks 26 and 28, identified as DRAM A and DRAM B. To alternately write these frames of data into memory banks 26 and 28, a D flip-flop circuit 30 is utilized to alternately enable and permit writing of the data from formatter 22 on line 32 into the respectively enabled memory bank 26 or 28. That is to say, for each VSYNC pulse provided on input line 34 to the clock input of circuit 30, the output enable line OUTPUT EN and the write control line WRITE of alternating memory banks will be enabled.

A DMD control circuit 40 alternately reads the data from these two memory banks 26 and 28 for successive frames of data to be displayed. The data is output on line 42 and written into the memory cells of a DMD spatial light modulator shown at 44. DMD control circuit 40 is responsively synchronized to the color segment being illuminated of a color wheel generally shown at 50. This is done utilizing an optical sensor 52 to sense a reference point 53 of wheel 50 each time it is rotated therepast. Sensor 52 provides a reference signal or tick on line 54 to DMD control circuit 40 to initiate the sequence start by circuit 40 for the writing of data from one memory bank 26 or 28 to DMD data 44. By sensing the reference signal on line 54, DMD control circuit 40 is synchronized to read data from one of the memory bank 26 or 28 corresponding to the colored segment currently being illuminated by a light source 56, with light focused thereupon by a lens 58. A lamp driver circuit 60 controls the illumination of light source 56. In this way, DMD control circuit 40 will read data associated with the red, green or blue data which corresponds to which colored segment of wheel 50 is being illuminated, and loads the color data into the DMD 44. In this way, the pixel mirrors of SLM 44 modulate the colored light incident to the array depending on whether the source light is red, green, or blue. A lens 62 is utilized to homogeneously illuminate DMD 44, whereby a projection lens 66 is utilized the focus the light image formed by SLM 44 on a screen 68.

The data write algorithm and apparatus described so far is discussed in more detail in the commonly assigned Patents and Patent applications incorporated herein by reference in the section Background of the Invention, and is well understood in the art. Depending on the amount of data in each frame received by formatter 22, two or more banks of memory can be utilized and controlled by DMD control circuitry 40. At least two banks of memory are utilized so that one bank can be read while the other bank is being written into. That is to say, the contents of one memory bank are being selectively unloaded on line 42 and provided to DMD 44 to modulate the incident colored light illuminating the DMD mirror array 44, while the next frame of data to be loaded into DMD 44 is being written into the other memory bank.

According to the preferred embodiment of the present invention, control circuit 12 will now be discussed in considerable detail. Basically, control circuitry 12 detects and calculates the period between consecutive vertical sync VSYNC pulses to determine the frame rate of the video data provided by source 14. If the data frame rate is determined to be other than a predetermined 60 hertz, the circuitry 12 establishes the color wheel 50 to have a rotation rate to be an integer ratio with respect to the frame rate of the incoming data. Circuitry 12 insures that the transition time between frames of incoming data provided on input line 20 correspond in time to when one of the six spokes, the spokes being the interface between adjacent colored segments of wheel 50, is being illuminated by light source 56. Alternatively, circuitry 12 can insure a frame transition occurs at the center of a colored segment. The segment may be illuminated at the frame transition.

If the incoming data frame rate is 50 hertz, i.e. a PAL signal, the color wheel 50 is rotated at 58.33 hertz, which is a 7-to-6 ratio. If the incoming data rate is 72 hertz, i.e. corresponding to computer graphics data, the color wheel 50 is rotated at 60 hertz, which is a -5-to-6 (color wheel rotation rate to incoming data rate, 60/72=5/6) ratio. Of course, for other frame rates of incoming signals, different ratios can be established while maintaining approximately a 60 hertz display rate. With the color wheel 50 being partitioned into six colored segments, having two segments of red, two segments of green and two segments of blue, the transition time between frames of data provided on input line 20 corresponds in time to when one of the six spokes of wheel 50 are being illuminated by light source 56 and lens 58. This can be further understood by example and will be now discussed.

Still referring to FIG. 2, control circuit 12 is seen to comprise a phase comparator circuit 70. Comparator 70 senses the time period of consecutively sensed vertical sync VSYNC pulses provided on input line 16 in reference to the time period between the wheel sync pulses provided by sensor 52 on line 71, and provides an error signal on line 73. A ratio-based speed control logic circuit 72 is responsive to the error signal output by this phase comparator circuit 70 on line 73. The speed control logic circuit 72 provides an output on line 74 to a motor winding control and drive circuit 76, which in turn provides a control signal on line 78 to wheel motor 80. If the phase comparator circuit 70 senses the period between vertical sync VSYNC pulses to have a duration of 16.66 microseconds, speed control logic circuit 72 directs the motor winding control and drive circuit 76 to rotate motor 80 at 60 hertz, maintaining a zero error on line 73. In this situation, the color wheel 50 is rotated in synchronism with the incoming data rate, 60 hertz.

If phase comparator circuit 70 senses consecutive vertical sync VSYNC pulses to have a 20 ms period, corresponding to 50 hertz which is typical of a PAL system, while the wheel sync pulses have a period of about 16.66 ms, a negative error is output by comparator 70 on line 73. The ratio based speed control logic circuit 72 responds to the negative error by instructing motor winding control and drive circuit 76 to slow the motor 80 to 58.33 hertz, which is done by slowing motor 80 until a predetermined negative error is output by comparator 70 on line 73 and sensed by control logic 72.

Lastly, if phase comparator circuit 70 senses the vertical sync VSYNC pulse to be 13.88 milliseconds, corresponding to 72 hertz which is typical of computer graphics information and data, while a wheel sync period is about 16.66 ms, then a positive error is generated by comparator 70. The speed control logic 72 responds to the positive error by instructing motor winding control 76 to rotate motor 80 at 60 hertz, which is done by adjusting the speed of motor 80 and wheel 50 until a predetermined positive error is provided on line 73 by comparator 70 and sensed by logic circuit 72. In summary, control circuit 12 controls the speed of motor 80 as a function of a sensed error signal from comparator 70 to ensure color wheel 50 rotates at a wheel rate being a ratio of integers when compared to the frame rate of data provided on line 20. This is done by establishing a zero error, or a predetermined positive or negative error from comparator 70.

By way of illustration, and first referring to FIG. 3, in the case when the incoming frame of data is received at 50 hertz, and the period of VSYNC is 20 ms, the color wheel is shown to be rotated at 58.33 hertz, which is a 7/6 ratio. For the first frame of data to be displayed, shown at 82, seven colored segments of wheel 50 will be illuminated. For the first frame of data 82 to be displayed, three blue segments will be illuminated, while two green segments will be illuminated, and two red segments will be illuminated as well. It is to be noted that the transition time between the first frame of data and a second frame of data, shown at 84, occurs when a spoke (interface) between a blue and green segment, shown at 86, is being illuminated by lamp 56. When the second frame of data, shown at 88, is to be displayed, three green segments will be illuminated wherein two red segments will be illuminated, and two blue segments will also be illuminated. The transition in time between the display of the second frame of data and the third frame of data 90, shown at 96, occurs when the spoke or interface 92 between the green and red segment is being illuminated.

It can be seen that the transition in time between the frames of source data will always correspond to when an interface or spoke between a pair of colored segments of wheel 50 is being illuminated. With color wheel 50 being partitioned into six segments, having three pairs of different colored segments, namely, red, green and blue, the ratio of integers can be maintained. When the incoming data frame rate is less than 60 hertz display rate, a segment of one color of the wheel will be displayed one more time than the other two colored segments. This is a blue colored segment for frame 1, a green segment for frame 2, and a red segment for frame 3, with this pattern repeating for subsequent displayed frames of data. For successive frames of data, a segment of one color is illuminated one more time than the others. Due to the integration of color by the human eye, minimal or no artifacts are generated that are observable by the human eye, depending on the type of data source. In the example shown in FIG. 2, a blue colored segment will be illuminated three times for data frames one and four, a green segment will be illuminated three times for frames two and five, and a red segment will be illuminated three times for frames three and six.

The start of the read cycle of the memory banks 26 and 28, identified as DRAM A and DRAM B, is shown to correspond with the transitions between the frames of data, i.e., that shown at 84 and 96 etc.

Figure 4A:
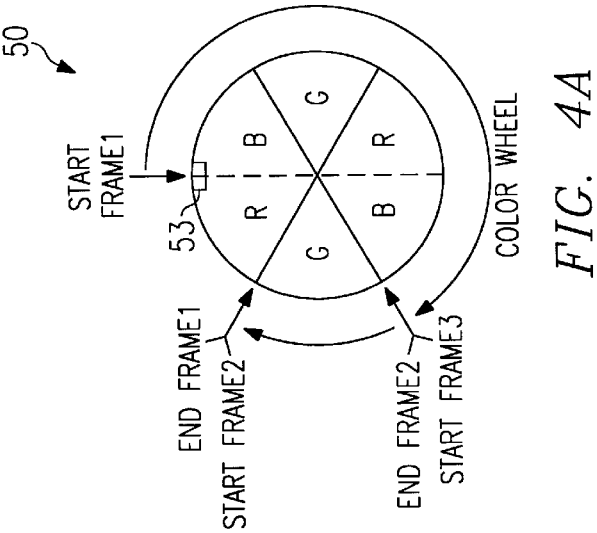
FIG. 4 is an illustration of the spoke-synchronous frame rate conversion when the input data frame rate is greater than the color wheel rate, again, whereby the color wheel rate is maintained to be a ratio of integers with respect to the incoming frame rate, i.e., a 5-to-6 ratio.
Figure 4:
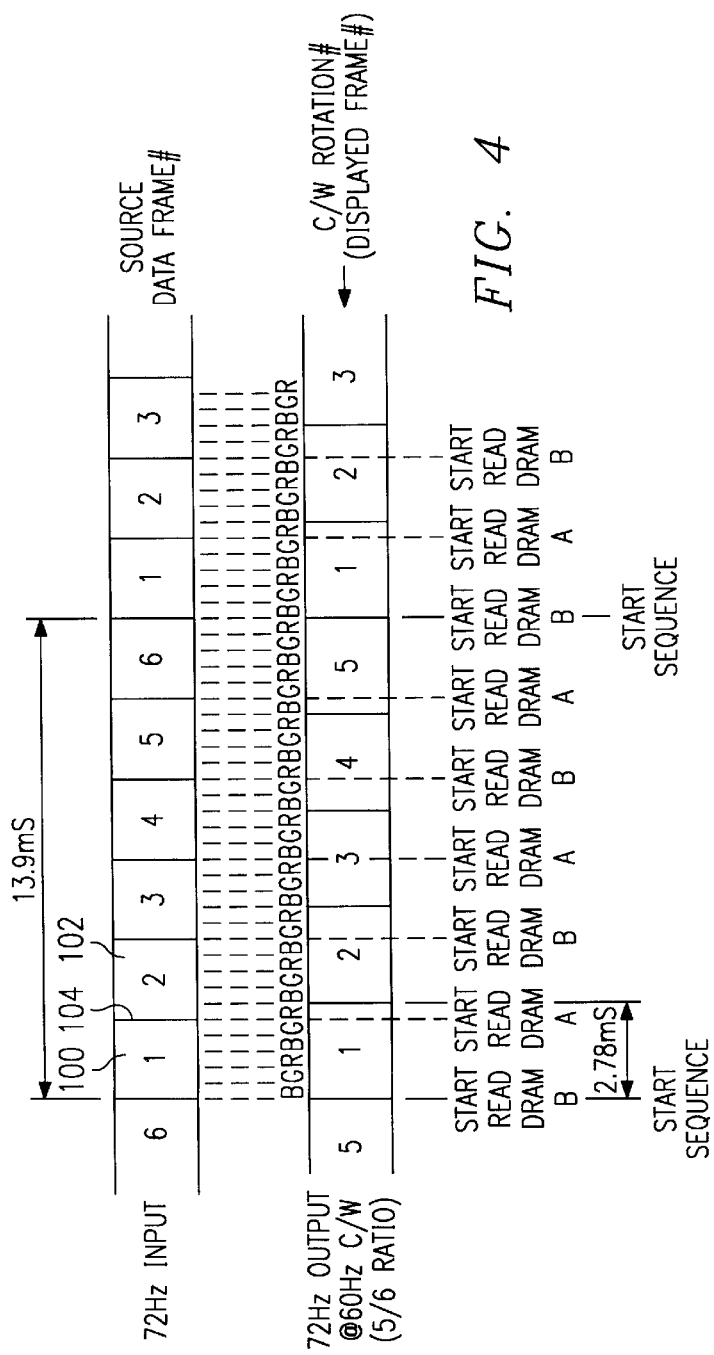

Referring now to FIG. 4, there is illustrated the spoke-synchronous frame rate conversion process according to the present invention when the source frame rate is greater than 60 hertz, i.e. 72 hertz, corresponding to computer graphics information. In this illustration, the color wheel is rotated at 60 hertz, thereby establishing a 5-to-6 ratio of the color wheel rate in reference to the source frame rate. The first frame of data to be displayed is shown at 100, the second frame of data is shown at 102, with the transition time being shown at 104. The transition 104 in time is seen to correspond to the spoke or transition between a green and red colored segment being illuminated by source 56. For the first frame of data to be displayed, the first five sequentially presented color segments are utilized, namely, blue, green, red, blue and green. When displaying the second frame of data, a red segment from the first rotation of the color wheel is utilized, whereby the next four illuminated color segments of the second rotation of the color wheel are illuminated. It can be seen that the transition in time between each of the displayed data frames always corresponds to the spoke (interface) between a pair of colored segments. Moreover, the video frame rate displayed is still 60 hertz, corresponding to the color wheel rate. For each frame of data to be displayed, a segment of one color will be illuminated only once, wherein segments of the other two colors will each be illuminated twice.

For example, when the first data frame is to be displayed, two blue colored segments are illuminated, two green colored segments are illuminated, however, a red colored segment is illuminated only once. The next time a red colored segment is illuminated is when the second frame of data is to be displayed. As with the example of FIG. 3, the color of a segment which is illuminated more times or less times than the other two colored segments shifts from data frame to data frame. Again, due to the integration of color by the human eye, minimal or no visible artifacts will be perceived by the human eye. The pattern of where the transition in time between the data frames occurs with respect to the color wheel repeats ever 5 rotations of the wheel, as shown.

The present invention achieves technical advantages by synchronizing the source data frame rate to the various spokes of the color wheel. In this way, the transition time from frame to frame always occurs in association with the spokes of the color wheel. No data is discarded or filtered before video data is displayed. The mismatch of bandwidths between the input source video and the output sequential color display is accommodated, whereby no mixing of frame-to-frame bit planes during a color segment is required. The video frame rate is still maintained at about 60 hertz, and minimal or no visual artifacts are perceived by the human eye.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A display system, comprising:
   a spatial light modulator;
   a light source providing light;
   a color wheel rotating at a wheel rate and coloring said light, said colored light illuminating said spatial light modulator;
   a logic circuit having an input receiving frames of data at a frame rate and communicating said data to said spatial light modulator; and
   a control circuit detecting said frame rate, responsive to a vertical sync rate corresponding to said frame rate, and providing a wheel motor sync output at a rate as a function of said vertical sync rate of said frames of data, said sync output rate being unequal to said vertical sync rate when said vertical sync rate deviates from a predetermined rate, said wheel rate being a function of said sync output, and adjusting said color wheel rate so that said wheel rate compared to said frame rate is a ratio of integers, said integer ratio being other than one-to-one.

2. The display system as specified in claim 1 wherein said color wheel has a plurality of colored segments, wherein each said colored segment, but one or more, is illuminated for each said frame of data when said frame rate is less than said wheel rate.

3. The display system as specified in claim 1 wherein said color wheel has a plurality of colored segments, wherein at least one said colored segment is illuminated one more time than said other colored segments when said frame rate is greater than said wheel rate.

4. The display system as specified in claim 1 wherein said color wheel has multiple colored segments, wherein each said colored segment except one or more is illuminated equally in time for each said frame of data by said light source when said frame rate is less than said wheel rate.

5. The display system as specified in claim 1 wherein said color wheel has multiple colored segments, wherein each said colored segment except one or more is illuminated equally in time for each said frame of data by said light source when said frame rate is greater than said wheel rate.

6. The display system as specified in claim 1 wherein said color wheel has n colored segments, wherein no more than n−1 said segments are illuminated each said data frame when said frame rate is less than said wheel rate.

7. The display system as specified in claim 1 wherein said color wheel has n colored segments, wherein at least n+1 said segments are illuminated each said data frame when said frame rate is greater than said wheel rate.

8. The display system as specified in claim 1 wherein the ratio of said frame rate to said wheel rate is 7-to-6 when said frame rate is less than said wheel rate.

9. The display system as specified in claim 1 wherein the ratio of said frame rate to said wheel rate is 5-to-6 when said frame rate is greater than said wheel rate.

10. The display system as specified in claim 1 wherein said sync output rate is identical to said vertical sync rate when said frame rate is identical to said predetermined rate.

11. The method of operating a sequential display system, comprising:
    a) utilizing a color wheel having a plurality of colored segments to color source light illuminating a spatial light modulator, said color wheel rotating at a wheel rate;
    b) modulating said colored light with said spatial light modulator according to frames of data received at a frame rate; and
    c) controlling said wheel rate by responding to a vertical sync rate corresponding to said frame rate, and providing a wheel motor sync output at a rate as a function of said vertical sync rate of said frames of data, said sync output rate being unequal to said vertical sync rate when said vertical sync rate deviates from a predetermined rate, said wheel rate being a function of said sync output, and adjusting said color wheel rate so that said wheel rate compared to said frame rate is a ratio of integers, wherein said ratio of integers is other than one-to-one.

12. The method as specified in claim 11 wherein said color wheel has at least six said colored segments.

13. The method as specified in claim 11 wherein a transition time between said frames of data occurs when a transition between said wheel colored segments is at a predetermined position relative to said source light.

14. The method as specified in claim 13 wherein said predetermined position is such that said source light illuminates said transition between said colored segments.

* * * * *

UNITED STATES PATENT AND TRADEMARK OFFICE
CERTIFICATE OF CORRECTION

PATENT NO. : 6,002,452
DATED : December 14, 1999
INVENTOR(S) : Dan Morgan

It is certified that error appears in the above-indentified patent and that said Letters Patent is hereby corrected as shown below:

Cover Page, insert Item [60] under Related U.S. Application Data

--Provisional Application No. 60/000,047 June 8, 1995.--

Signed and Sealed this

Twentieth Day of March, 2001

*Attest:*

NICHOLAS P. GODICI

*Attesting Officer*     *Acting Director of the United States Patent and Trademark Office*